UNITED STATES PATENT OFFICE.

SAMUEL WILLIAMS, OF NEW YORK, N. Y.

IMPROVEMENT IN COMPOUNDS FOR COATING IRON SHIPS' BOTTOMS.

Specification forming part of Letters Patent No. 149,697, dated April 14, 1874; application filed March 28, 1874.

*To all whom it may concern:*

Be it known that I, SAMUEL WILLIAMS, of the city, county, and State of New York, have invented a new and useful Improvement in Submarine Compound or Paint for Iron Vessels, of which the following is a specification:

My invention has for its object to furnish an improved compound or paint for the outside of iron vessels below the water-line, to prevent the corrosion of the iron, and the accumulation upon the bottoms of the vessels of barnacles, weeds, &c., and which shall be simple in composition and very durable.

The compound is formed of the ingredients and in the proportions hereinafter fully set forth.

In preparing my improved compound I dissolve thirty-four ounces of shellac in eighty ounces of wood alcohol, which is allowed to stand about twenty-four hours. To this solution I then add thirty ounces of Venetian red, and thirty-five ounces of sulphate of lime, and thoroughly mix by passing it through a paint-mill, or in any other convenient manner.

The paint is now ready for use, and is applied with a brush in the same way as ordinary paint, and will dry instantly, so that the vessel may be lowered into the water within an hour after the paint has been applied.

When the prepared compound is to be kept for any considerable length of time before using, it should be inclosed from the air.

The proportions of the ingredients herein given are considered the best for ordinary purposes, but may be varied somewhat without materially affecting it.

For vessels navigating fresh water, or both salt and fresh water, the proportions of the Venetian red and the sulphate of lime used may be diminished.

This paint may also be used upon the inside of the iron work of the vessel.

Having thus described my invention, I claim as new and desire to secure by Letters Patent—

An improved compound or paint for the outside of iron vessels below the water-line, formed of shellac, wood alcohol, Venetian red, and sulphate of lime, in about the proportions herein set forth and described.

SAMUEL WILLIAMS.

Witnesses:
JAMES T. GRAHAM,
T. B. MOSHER.